3,205,571
METHOD OF SOLDERING GRID WIRES, IN PARTICULAR TO FRAMES OF FRAME GRIDS OF ELECTRIC DISCHARGE TUBES
Gunter Andrae, Hamburg-Niendorf, Germany, assignor to North American Philips Company, Inc., New York, N.Y., a corporation of Delaware
No Drawing. Filed Nov. 21, 1962, Ser. No. 239,349
Claims priority, application Germany, Nov. 30, 1961, P 28,334
3 Claims. (Cl. 29—471.1)

It has been proposed to solder grid wires, in particular to frames of frame grids of electric discharge tubes by means of noble metals as the soldering material, silver oxide being provided on the joints and being exposed to a reducing atmosphere at elevated temperature prior to the actual soldering process.

In such a method, silver oxide is provided on the joints and is exposed to a reducing atmosphere prior to the actual soldering process respectively at a temperature between 760 and 850° C., preferably at 800° C. In this atmosphere the silver oxide reduces to metallic silver which flows to the joints between the frame and the grid wire stretched above it. Since the silver oxide can be manufactured with a smaller grain size than the silver metal, the soldering material in the form of the oxide can be provided nearer to the joints than in the form of a metal powder. Consequently, the use of silver oxide powder as the soldering material is favourable for soldering very small component parts, for example soldering grid wires to the frame of frame grids.

In this method, the silver oxide may also be used as a constituent of a soldering mixture which contains in addition methanol and glycerine. Providing the soldering material on the joints may then simply be effected, for example, by brushing.

For economic considerations a large number of grids coated with the soldering mixture will simultaneously be provided in the reduction furnace and heated to the reduction temperature of preferably 800° C. At this temperature, however, not only the silver oxide is reduced but also the glycerine burns and sooty products of combustion deposit on the grids which are situated close to one another. The products of combustion hamper the soldering process succeeding the reduction, since the surfaces of the grid parts to be soldered are contaminated after the deposition of the products of combustion.

The drawback described is avoided when using the method according to the invention in that the frames provided with grid wires are pre-fired at a temperature between 300 and 400° C. for a short time in a neutral or oxidizing atmosphere after providing the soldering mixture but before heating in the reducing atmosphere.

During the firing process at the above-stated temperatures, preferably in air, the glycerine burns without leaving a sooty deposit on the grids. On firing, also the methanol evaporates. It has proved in practice that the methanol, also if it is not completely evaporated and enters the reduction furnace is harmless.

Pre-firing is preferably effected at 350° C. for 7 minutes. The temperature must be kept low so that oxidizing of the grid wires usually consisting of tungsten and of the molybdenum beams is avoided as much as possible. However, some reduction occurs also during the subsequent firing in the reducing atmosphere.

The method according to the invention may be improved if the soldering material contains additions of copper- and nickel-oxide. The copper oxide and the copper obtained after the reduction respectively in the first instance decreases the melting point of the silver also formed during the reduction since it forms an alloy with it. The nickel formed during the reduction decreases the surface tension of the silver thereby causing the liquid soldering material to better penetrate into the seams of the joint.

In order that the invention may readily be carried into effect, it will now be described more fully, by way of example, with reference to a specific example.

17 parts by weight of silver oxide, 7.7 parts by weight of copper oxide, 2.0 parts by weight of nickel oxide, 18 parts by weight of methanol and 16 parts by weight of glycerine are mixed to form a suspension. This suspension is coated, for example, by means of a brush, on one of the two support rods of a frame grid or on a ladder of frame grids. Preferably, a plurality of grids thus treated are collectively heated at a temperature of approximately 350° C. for seven minutes in air. The glycerine burns. Subsequently, the grids are exposed to a hydrogen atmosphere at a temperature of approximately 790° C. for approximately 15 minutes. The oxides of silver, copper and nickel are reduced to form the metals, the temperature in the grid parts on which the mixture is provided being increased to above the furnace temperature as a result of the reduction heat. The metallic silver, the surface tension of which is decreased by the presence of the nickel, flows between the contact places of the grid wires with the beam (beams), where satisfactory soldered joints are formed after cooling.

What is claimed is:
1. A method of securing grid wires on a support comprising the steps of applying a suspension containing silver oxide in methanol and glycerine on the joint between the wire and the support, prefiring the grid wire and support with the susension on the joint at a temperature between 300° and 400° C. in a non-reducing atmosphere to volatilize the methanol and glycerine without leaving any carbon residue, and thereafter heating the wire and the support with the susension at the joint at a temperature between 760° and 850° C. in a reducing atmosphere to solder the wire to the support.
2. A method as claimed in claim 1, in which the support and the wire with the suspension at the joint thereof is pre-fired in air at approximately 350° C. for approximately seven minutes.
3. A method as claimed in claim 2 in which a soldering mixture is used which consists of 17 parts by weight of silver oxide, 7.7 parts by weight of copper oxide, 2.0 parts by weight of nickel oxide, 18 parts by weight of methanol and 16 parts by weight of glycerine.

References Cited by the Examiner
UNITED STATES PATENTS

| | | | |
|---|---|---|---|
| 2,106,982 | 2/38 | Kepfer | 148—25 X |
| 2,594,313 | 4/52 | Klinker | 148—24 X |
| 2,646,620 | 7/53 | Geddes et al. | 29—495 |
| 2,759,446 | 8/56 | Ewing | 29—502 X |
| 2,927,049 | 3/60 | Wasserman et al. | 148—25 |
| 3,055,096 | 9/62 | Bertossa | 29—504 X |

JOHN F. CAMPBELL, *Primary Examiner.*